United States Patent
Christensen et al.

(10) Patent No.: US 8,116,321 B2
(45) Date of Patent: Feb. 14, 2012

(54) SYSTEM AND METHOD FOR ROUTING ASYNCHRONOUS SIGNALS

(75) Inventors: Carl Christensen, South Jordan, UT (US); David Lynn Bytheway, Murray, UT (US); Lynn Howard Arbuckle, Bountiful, UT (US); Randall Geovanny Redondo, Holladay, UT (US)

(73) Assignee: Thomson Licensing, Boulogne-Billancourt (FR)

( * ) Notice: Subject to any disclaimer, the term of this patent is extended or adjusted under 35 U.S.C. 154(b) by 1179 days.

(21) Appl. No.: 11/628,807

(22) PCT Filed: Jun. 1, 2005

(86) PCT No.: PCT/US2005/019115
§ 371 (c)(1),
(2), (4) Date: Dec. 6, 2006

(87) PCT Pub. No.: WO2006/009605
PCT Pub. Date: Jan. 26, 2006

(65) Prior Publication Data
US 2008/0052552 A1    Feb. 28, 2008

Related U.S. Application Data

(60) Provisional application No. 60/580,188, filed on Jun. 16, 2004, provisional application No. 60/580,189, filed on Jun. 16, 2004.

(51) Int. Cl.
| | |
|---|---|
| H04L 12/28 | (2006.01) |
| H04L 12/56 | (2006.01) |
| H04L 5/00 | (2006.01) |
| H04L 7/00 | (2006.01) |
| H04J 3/06 | (2006.01) |
| G06F 1/04 | (2006.01) |
| G06F 1/12 | (2006.01) |
| G06F 15/16 | (2006.01) |
| G06F 13/42 | (2006.01) |
| G06F 5/06 | (2006.01) |
| G06F 1/08 | (2006.01) |
| H03K 5/22 | (2006.01) |
| H03K 17/00 | (2006.01) |
| H03L 7/00 | (2006.01) |

(52) U.S. Cl. .......... 370/395.62; 370/503; 713/375; 713/401; 713/601; 327/24; 327/99; 327/152; 327/298; 327/407

(58) Field of Classification Search .......... None
See application file for complete search history.

(56) References Cited

U.S. PATENT DOCUMENTS 3,627,954 A * 12/1971 Quinn .......................... 379/237
(Continued)

FOREIGN PATENT DOCUMENTS

EP    0530398    3/1993
(Continued)

OTHER PUBLICATIONS

Search Report dated Sep. 16, 2005.

*Primary Examiner* — Nittaya Juntima
*Assistant Examiner* — Andrew Oh
(74) *Attorney, Agent, or Firm* — Robert D. Shedd; Robert B. Levy

(57) ABSTRACT

A router, for routing at least one input signal to at least one output, comprises at least one input module and at least one output module. Each of the input and output modules includes at least one clock selector circuit for selecting from among a first and second clock signal, and an oscillator signal, as a common output clock signal for the at least first router, based in part on whether at least one of the first and second clock signals has toggled. The clock selector circuit provides redundancy as well as distribution of clock signals among elements within each module.

10 Claims, 7 Drawing Sheets

U.S. PATENT DOCUMENTS

| | | | |
|---|---|---|---|
| 3,974,461 A * | 8/1976 | Luce | 84/700 |
| 4,254,492 A * | 3/1981 | McDermott, III | 368/119 |
| 4,322,580 A * | 3/1982 | Khan et al. | 379/279 |
| 4,534,044 A * | 8/1985 | Funke et al. | 375/374 |
| 4,617,679 A * | 10/1986 | Brooks | 375/374 |
| 4,794,596 A | 12/1988 | Gloyne et al. | |
| 5,373,537 A | 12/1994 | Oberhauser et al. | |
| 5,479,648 A | 12/1995 | Barbera et al. | |
| 5,614,868 A * | 3/1997 | Nielson | 331/1 A |
| 5,828,243 A * | 10/1998 | Bagley | 327/99 |
| 6,104,667 A | 8/2000 | Akaogi | |
| 6,121,816 A | 9/2000 | Tonks et al. | |
| 6,310,498 B1 * | 10/2001 | Larsson | 327/158 |
| 6,658,580 B1 | 12/2003 | Bell et al. | |
| 6,906,570 B2 * | 6/2005 | Kim | 327/292 |
| 7,167,479 B2 * | 1/2007 | Christensen et al. | 370/401 |
| 2002/0126783 A1 | 9/2002 | Landaiche | |
| 2003/0052886 A1 | 3/2003 | Naegle | |
| 2004/0158759 A1 * | 8/2004 | Chang et al. | 713/500 |

FOREIGN PATENT DOCUMENTS

WO  WO04/002089  12/2003

* cited by examiner

METHOD CAN BE EXTENDED PAST THE NUMBER OF EXTERNAL OUT PORTS BY "DAISY CHAINING"

SYSTEM AND METHOD FOR ROUTING ASYNCHRONOUS SIGNALS

CROSS-REFERENCE TO RELATED APPLICATIONS

This application claims the benefit, under 35 U.S.C. §365 of International Application PCT/US05/19115 filed Jun. 1, 2005, which was published in accordance with PCT Article 21(2) on Jan. 26, 2006 in English and which claims the benefit of U.S. provisional patent application Nos. 60/580,188, 60/580,189, filed Jun. 16, 2004.

FIELD OF THE INVENTION

This invention relates to routers and more specifically to broadcast routers that route asynchronous signals.

BACKGROUND OF THE INVENTION

A router comprises a device that routes one or more signals appearing at the router input(s) to one or more outputs. Routers used in the broadcast industry typically employ at least a first router portion with a plurality of router modules (also referred to as matrix cards) coupled to at least one expansion module. The expansion module couples the first router chassis to one or more second router portion to allow further routing of signals. Many broadcast routers, and especially those that are linearly expandable, route asynchronous signals. Asynchronous signal routing by such linearly expandable routers requires an accurate clock signal throughout the entire route to preserve the integrity of routed data. For an asynchronous signal, a difference in clock frequency from one location to another can cause corruption of the signal and loss of the data represented by that signal. Even a difference in clock frequencies as small as 1 part per million (PPM) can have an undesirable effect on data. Typical examples of data corruption include repeated or dropped signal samples.

As linearly expandable routers increase in complexity, the problem of supplying an accurate and synchronized clock signal to various elements becomes more difficult. For purposes of discussion, a clock signal constitutes a signal that oscillates between a high and a low state at defined intervals. Typical clock signals oscillate with a 50% duty cycle. However, clocks having other duty cycles are also commonly employed. Circuits using clock signals for synchronization become active upon one of the rising or falling edge of the clock signal.

A so-called, "clock multiplexer" refers to a circuit, as typically exists within a linearly expandable router, for selecting at least one clock signal from a plurality of available clock signals. The selected clock signal(s) serve to trigger other elements. When selecting among available clock signals, the output signal selected by the clock multiplexer should not include any undefined pluses. Undefined pulses occur, for example, when a selected clock signal undergoes a disruption. Such a disruption can include a missing clock signal as well as a clock signal that fails to switch states as expected. Some times, an input clock signal will remain "stuck" indefinitely at one logic state or the other. Such disruptions frequently produce undefined pulses including runt pulses, short pulses, pulses of indefinite duration, glitches, spikes and the like.

Prior art attempts to avoid undefined pulses at the output of a clock multiplexer include so-called "safe" clock multiplexers. A typical safe clock multiplexer switches from a presently selected input to a next selected input in an orderly manner. Thus, a safe multiplexer does not switch until the selected input clock signal transitions to a known state and the subsequently selected clock signal transitions to the same state as the previously selected clock signal.

However, prior art safe clock multiplexers have drawbacks. For example, when a presently selected clock signal fails to transition to a known state, a safe clock multiplexer will often lack the ability to switch to another clock signal. Prior art safe clock multiplexers have not tolerated these and other types of clock disruptions.

Thus, a need exists for a technique for providing a selected one of a set of clock signals, such as within a linearly expandable router, that overcomes the aforementioned disadvantages

SUMMARY OF THE INVENTION

Briefly in accordance with a preferred embodiment of the present principles, there is provided a method for selecting a clock signal from among at least first and second clock signals. The method commences by detecting a failure of a first clock signal to change state and by detecting a failure of a second clock signal to change state. A selection occurs from among the first and second clock signals and an oscillator signal, based in part on whether at least one of the first and second clock signals has toggled

DETAILED DESCRIPTION

Figure 1:
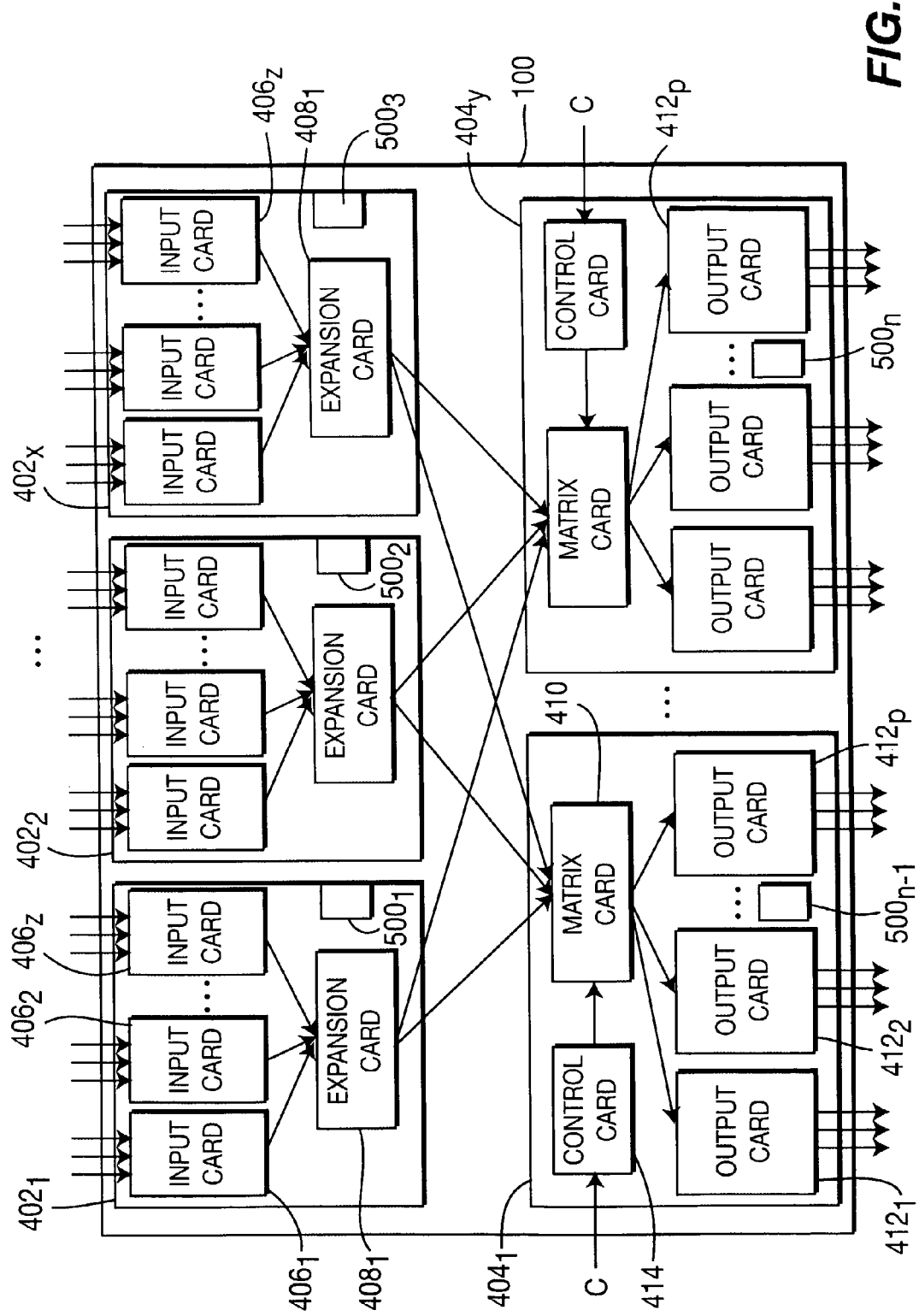
FIG. 1 illustrates a block schematic diagram of a router according to an illustrative embodiment of the present principles.

FIG. 1 depicts a block schematic of a broadcast router 100 in accordance with a preferred embodiment of the present principles. In a preferred embodiment, the router 100 comprises at least one, and preferably a plurality input modules $402_1, 402_2 \ldots 402_x$ where x is an integer greater than zero, and at least one, and preferably, a plurality of output modules $404_1 \ldots 404_y$, where y is an integer. Each input module, such as input module $402_1$, comprises at least one, and preferably a plurality of input cards $406_1, 406_2 \ldots 406_z$ where z is an integer greater than zero. Each input card has at least one, and preferably, a plurality of inputs for receiving signals for multiplexing into an output signal. Different input cards typically have different signal receiving capabilities to afford the ability to receive signals from a variety of sources. An expansion card 408 within each input module, such as module $402_1$, multiplexes the output signals from the input cards $406_1$-$406_z$ into an output signal.

Each second module, such as second module $404_1$, has a matrix 410 card which de-multiplexes the input signals from one or more of the input modules for delivery to at least one, and preferably a plurality of output cards $412_1, 412_2 \ldots 412_p$, where p is an integer greater than zero. Each output card delivers one or more output signals to one or more external devices (not shown). A control card 414 controls the matrix card 410 in response to an external control signal C to cause the matrix card to route its output signal among various of the output cards $412_1$-$412_p$. In this way, the matrix card 410 can effectuate routing based on the external control signal C.

Figure 2:
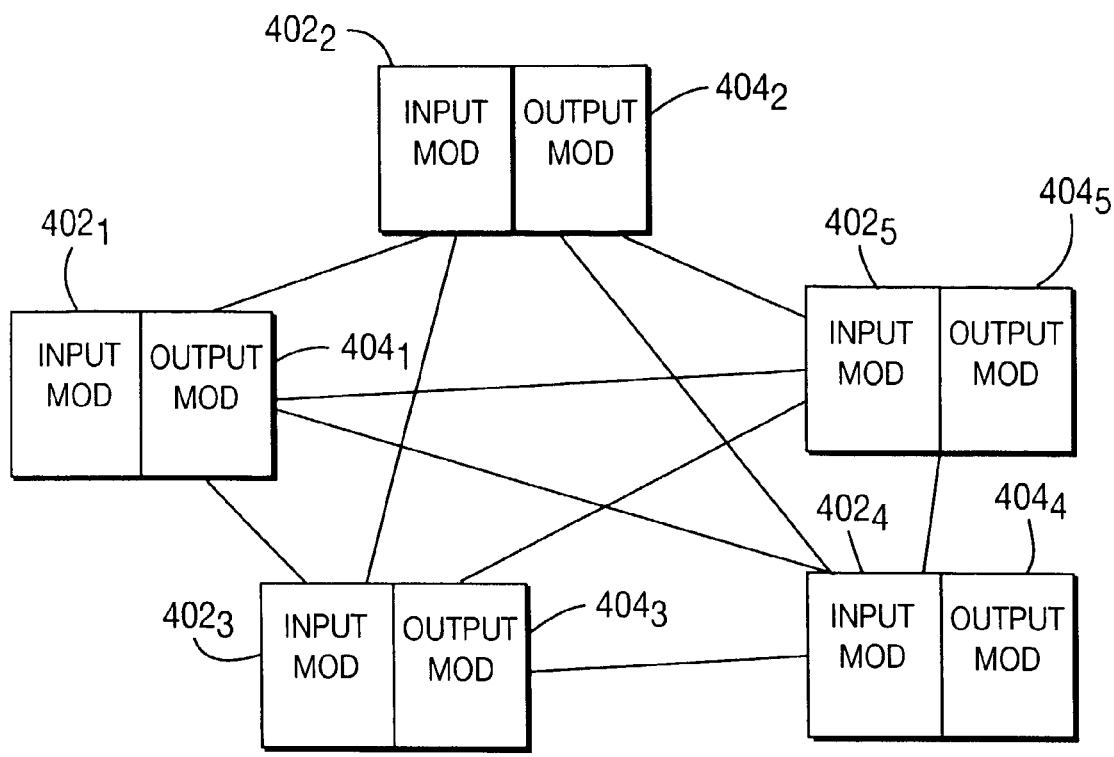
FIG. 2 illustrates a first alternate arrangement of input and output modules for the router of FIG. 1
Figure 3:
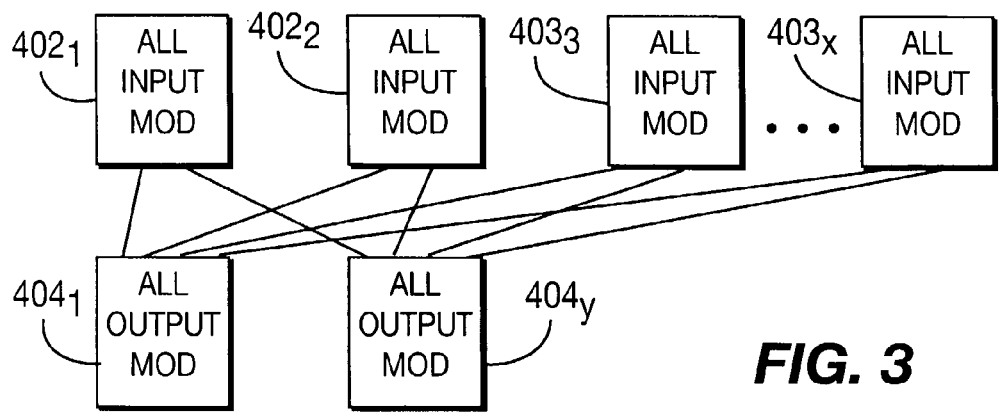
FIG. 3 illustrates a second alternate arrangement of input and output modules for the router of FIG. 1.
Figure 4:
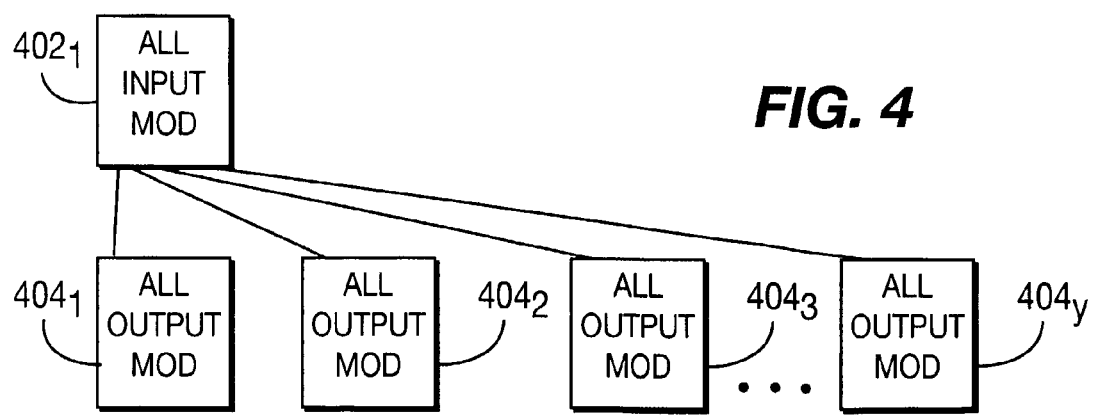
FIG. 4 illustrates a third alternate arrangement of input and output modules for the router of FIG. 1

The router 100 of FIG. 1 has each of its input modules $402_1$, $402_2 \ldots 402_x$ coupled to each of the output modules $404_1$, $402_2 \ldots 404_y$. Other arrangements are possible. FIG. 2 illustrates a first alternate arrangement of input and output cards for the router 100 of FIG. 1 wherein the input and output modules are arranged to provide the same number of inputs and outputs. FIG. 3 illustrates a second alternate arrangement of input and output modules for the router 100 of FIG. 1 in which there are more inputs than outputs. FIG. 4 illustrates a third alternate arrangement of input and output modules for the router 100 of FIG. 1 in which there are more outputs than inputs.

Figure 5:
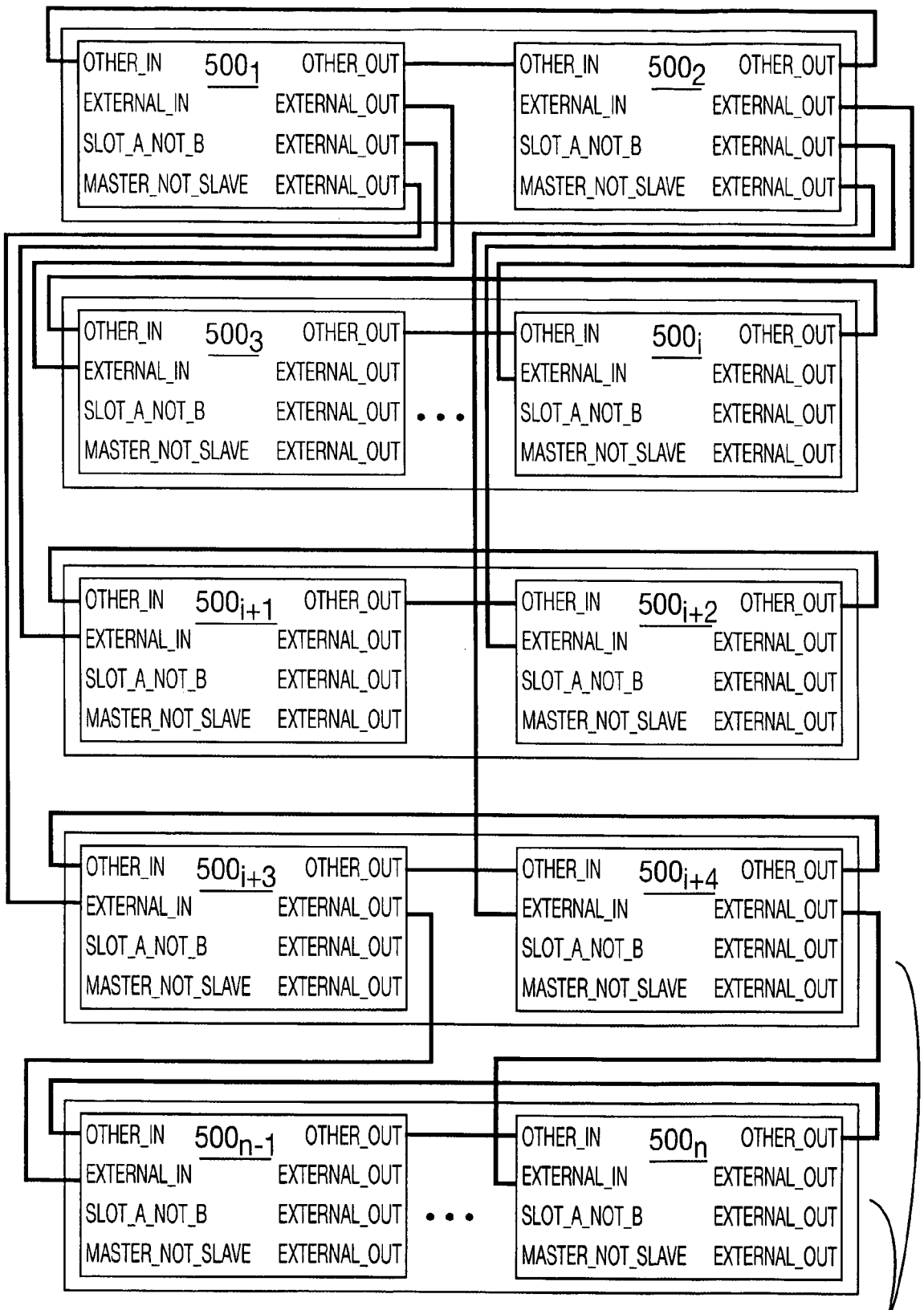
FIG. 5 illustrates a first network of clock selector circuits for use in the router of FIG. 1.

The input modules $402_1$-$402_x$ and the output modules $404_1$-$404_y$ of FIG. 1 typically each include at least one of clock modules $500_1$-$500_n$ where n≧x+y, with each clock module having a structure as described in greater detail with respect to FIG. 5. In practice, separate clock modules can exist in within one or more the elements within each input and output module of FIG. 1. Moreover, one or more clock module $500_1$-$500_n$ could exist as separate modular elements in the router 100, much like one of the input or output modules.

Referring to FIG. 5, the clock modules $500_1$-$500_n$ can interconnect with each other in a daisy chain fashion to yield a network 600 of clock modules. In the embodiment of FIG. 5, the clock module $500_1$ supplies its clock signal to the clock module $500_2$ as well as each of clock modules $500_3$, $500_{i+1}$ and $500_{i+3}$, where i≦n, whereas the clock module $500_2$ supplies its clock signal to each of modules $500_i$, $500_{i+2}$ and $500_{j+4}$. Each of the clock modules $500_1, 500_2 \ldots 500_n$ also receives the clock signal from a preceding one of clock modules $500_2 \ldots 500_i \ldots 500_{n-1}$, respectively.

Figure 6A:
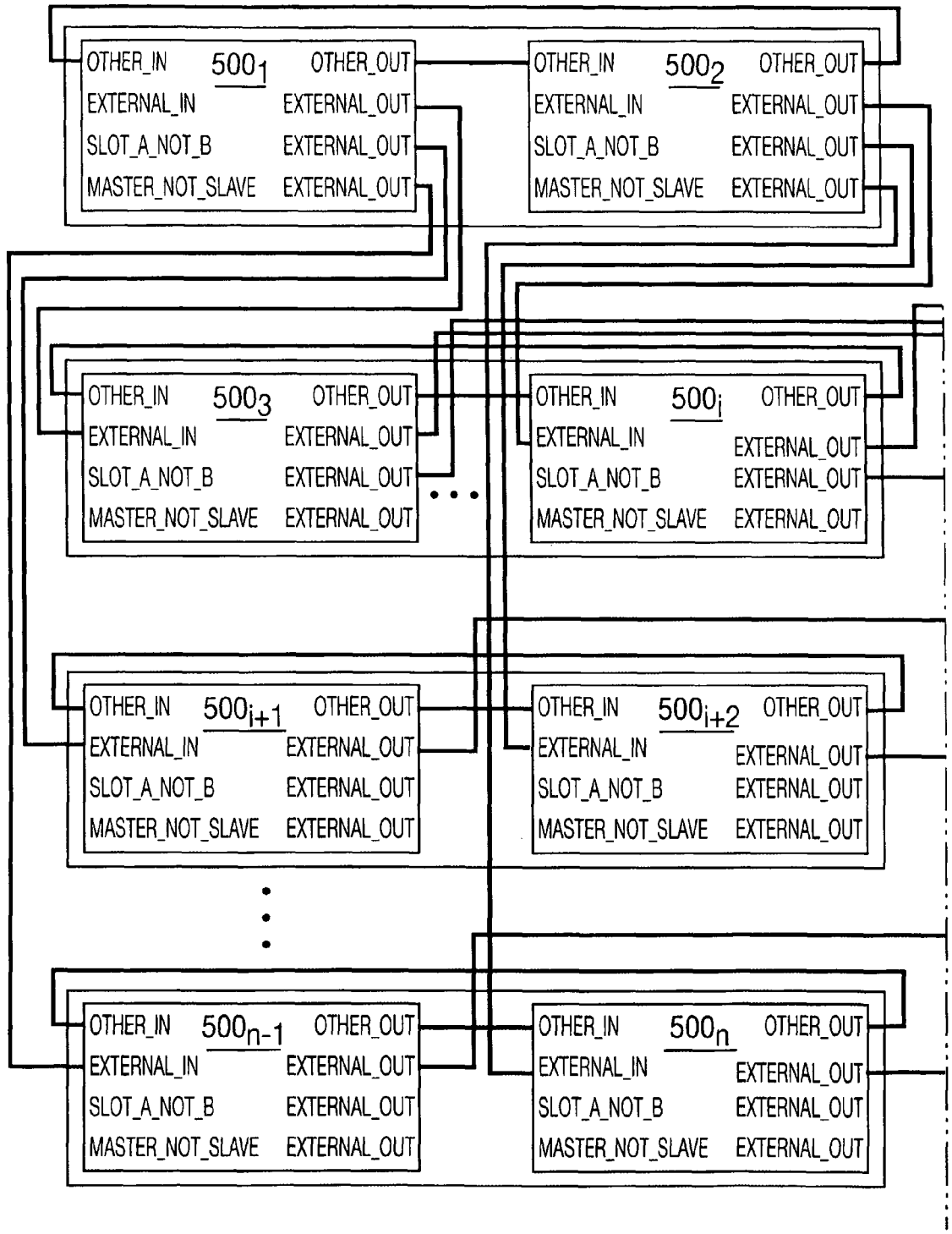
FIG. 6 depicts a second network of clock selector circuits for use in the router of FIG. 1
Figure 6B:
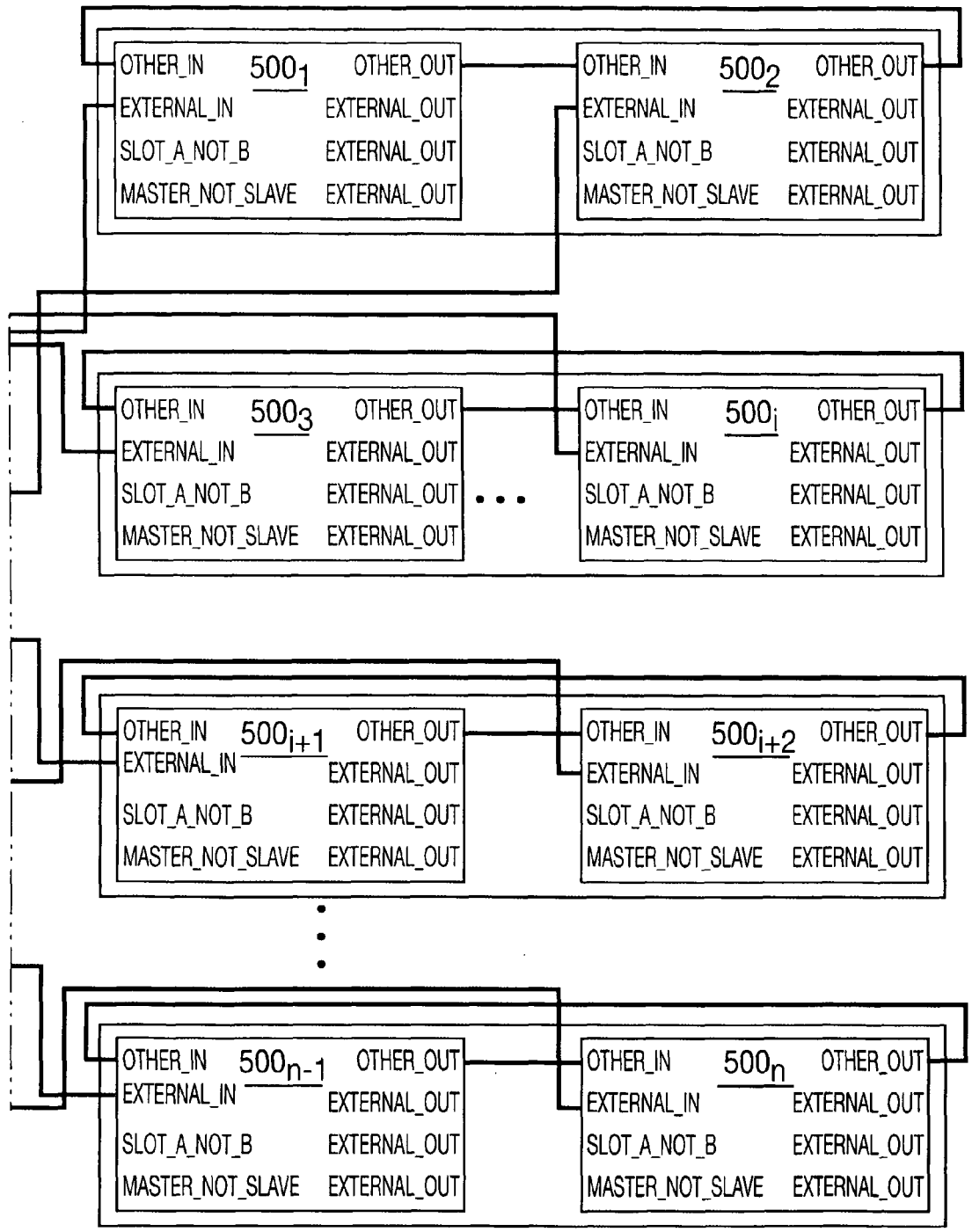

FIG. 6 depicts an alternate arrangement of clock modules wherein the modules are arranged in first and second networks $600_1$ and $600_2$, with each of the networks $600_1$ and $600_2$ configured similarly to the clock module network 600 of FIG. 2. As seen in FIG. 6, one or more of the individual clock modules $500_1$-$500_n$ of network $600_1$ provide clock signals to one or more of the clock modules $500_1$-$500_n$ of network $600_2$.

Figure 7:
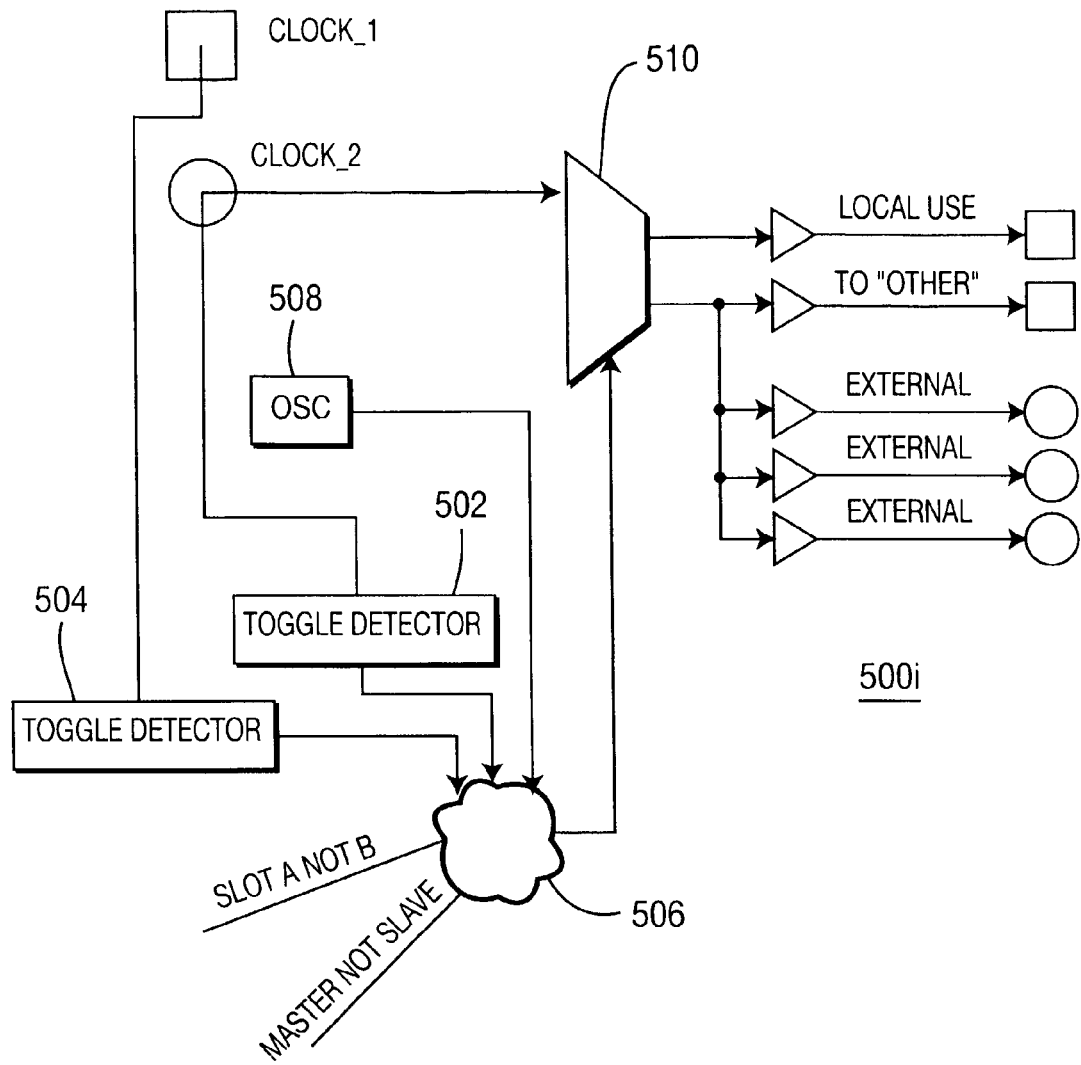
FIG. 7 depicts a block schematic diagram of an illustrative embodiment of a clock selector circuit within the networks of FIGS. 5 and 6.
Figure 8:
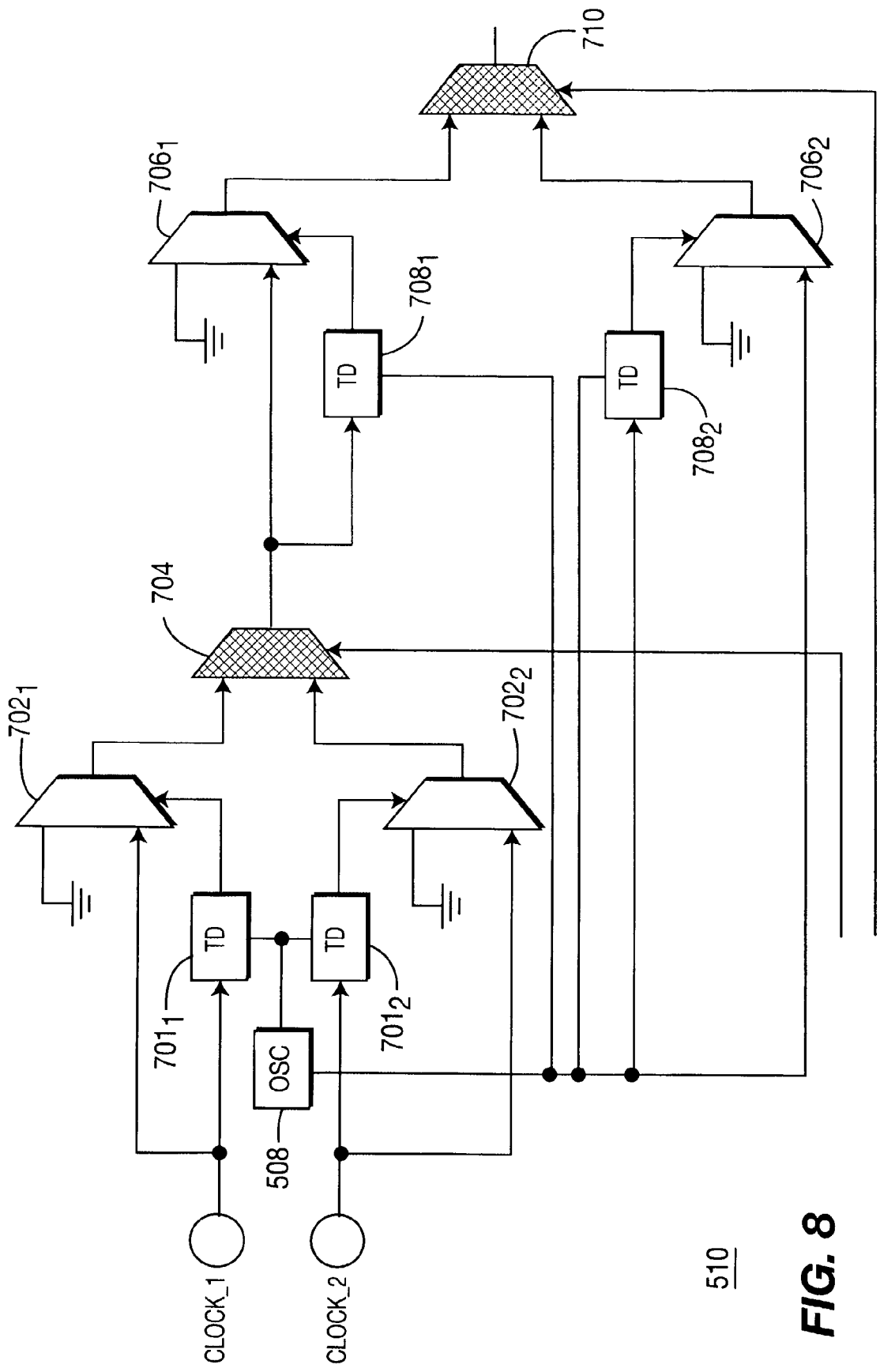
FIG. 8 depicts a safe clock multiplexer system of for use in the selector circuit of FIG. 4.

FIG. 7 depicts a block schematic diagram of an exemplary clock module $500_i$. The clock module $500_i$ of FIG. 4 includes first and second clock inputs that receive first and second clock signals Clock_1 and Clock_2, respectively. Each of the external clock signals Clock_1 and Clock_2 can comprise clock signals from a separate upstream clock selector circuit in the network of FIG. 2 or a clock signal from a reference clock circuit formed by an oscillator 508.

The clock selector circuit $500_i$ includes a pair of toggle detectors 502 and 504 which each receive a separate one of the Clock_1 and Clock_2 signals. Each toggle detector provides an output signal indicative of whether its respective input clock signal has toggled, i.e., a changed from one state to another. A logic block 506 receives the output signals of the toggle detectors 502 and 504, along with the output of an oscillator circuit 508 that generates a clock signal useful for meeting the timing requirements of various circuit elements. The logic block 506 also receives two external status signals;

(1) A_not B and (2) Master_not Slave. The state of the status signal A_not B indicates whether or not the clock circuit $500_i$ will provide the primary clock signal. The state of the Master_not Slave signal determines the clock circuit $500_i$ operates as its own master, or as a slave to another clock signal.

The logic block 506 generates an output control for controlling a safe clock multiplexer system 510 to select among the clock signals Clock_1, Clock_2 and the output signal of the oscillator 508, to provide a single clock signal to downstream elements (not shown). The output control signal of the logic block 506 has a prescribed relationship to the logic circuit input signals as shown in Table 1, with the "x" entries constituting "don't care" values. (In other words, the value of the particular input signal has no effect on the output of the logic block 506.)

TABLE I

| A_not B | Master_Not Slave | Toggle Detector 504 | Toggle Detector 502 | Safe clock multiplexer system 510 Output |
|---|---|---|---|---|
| 1 | 1 | x | x | Oscillator 508 |
| 0 | 1 | x | 1 | Clock_2 |
| 0 | 1 | x | 0 | Oscillator 508 |
| x | 0 | 1 | x | Clock_1 |
| x | 0 | 0 | 1 | Clock_2 |
| x | 0 | 0 | 0 | Oscillator 508 |

As seen from Table 1, for so long as the Master_Not Slave signal remains at a logic "1" level, the clock circuit $500_i$ only selects between Clock_2 and Oscillator 508. Under such conditions, the toggling of the Clock_1 signal, and hence the output signal of the toggle detector 504 has no effect. Conversely, when the clock circuit $500_i$ serves as a slave (i.e., the Master_Not Slave signal remains at a logic "0" level), the output states of the toggle detector 504, and the output state of the toggle detector 502, determine which of the Clock_1, Clock_2, and oscillator 508 signals appear at the output of the safe clock multiplexer system 510. The clock signal selected by the safe clock multiplexer system 510 provides a timing signal for local use as well as for input to elements within the router 100 of FIG. 1.

In a preferred embodiment, the safe clock multiplexer system 510 of FIG. 4 has the structure shown in FIG. 5 to afford the clock module $500_i$ of FIG. 3 the ability to tolerate an input clock pulse that has become stuck. Within the safe clock multiplexer system 510 of FIG. 5, first and second toggle detectors $701_1$ and $701_2$ receive the Clock_1 and Clock_2 signals, respectively, as do each of a pair of multiplexers $702_1$ and $702_2$, respectively. Each of the multiplexers $702_1$ and $702_2$ receives a signal and a logic "0" level at its second input.

The toggle detectors $701_1$ and $701_2$ control the multiplexers $702_1$ and $702_1$ in accordance with the state of Clock_1 and Clock_2 signals, respectively, as measured against the output signal of the oscillator 508. In other words, each of the toggle detectors $701_1$ and $701_2$ determines whether a respective one of the Clock_1 and Clock_2 signals has changed state (i.e., toggled) relative to the output signal of the oscillator 508. If a respective one of the toggle detectors $701_1$ and $701_2$ determines that a corresponding one of the Clock_1 and Clock_2 signals has toggled relative to the oscillator 508 output signal, then that toggle detector gates a corresponding one of the multiplexers $702_1$ and $702_2$. When gated, each of the multiplexers $702_1$ and $702_2$ passes and associated one of the Clock_1 and Clock 2 signals. Should a respective one of the clock signals Clock_1 and Clock_2 not toggle relative to the oscillator 508 output signal, then the corresponding one of the multiplexers $702_1$ and $702_2$ will output a logic zero level signal.

A multiplexer 704 receives at its first and second inputs the output signals of the multiplexers $702_1$ and $702_2$, respectively. In accordance with a signal from the logic block 506 of FIG. 4, the multiplexer passes the output signal of one of the multiplexers $702_1$ and $702_2$ to a first input of a multiplexer $706_1$ and to the input of a toggle detector $708_1$. The multiplexer $706_1$ has its second input supplied with a signal at a logic zero level.

The toggle detector $708_1$ controls the multiplexer $706_1$ in accordance with the relationship between the output signal of the multiplexer 704 and the output signal of the oscillator 508. In other words, the toggle detector $708_1$ determines whether the output signal of the multiplexer 704 has changed state relative to the output signal of the oscillator 508. If the output signal of the multiplexer 704 toggles relative to the oscillator 508 output signal, then the toggle detector $708_1$ causes the multiplexers $706_1$ to pass the output signal of the multiplexer 704. Otherwise, should the output signal of the multiplexer 704 not toggle relative to the output signal of the oscillator 508, the multiplexer $706_1$ will output a logic zero level signal.

A multiplexer $706_2$ receives at its first and second inputs the output signal of the oscillator 508 and a logic zero level signal, respectively. A toggle detector $708_2$ controls the multiplexer $706_2$ in accordance with the oscillator 508 output signal. In other words, the toggle detector $708_2$ determines whether the output signal of the oscillator 508 periodically changes state. If the oscillator 508 output signal does toggle, then the toggle detector $708_2$ gates the multiplexer $706_2$ to pass the output signal of the oscillator 508. Otherwise, should the output signal of the oscillator 508 not toggle, then the multiplexer $706_2$ will output a logic zero level signal.

A multiplexer 710 receives at its first and second inputs the output signals of the multiplexers $706_1$ and $706_2$, respectively. Like the multiplexer 704, the multiplexer 710 operates under the control of the logic block 506 of FIG. 4. Thus, depending on output signal of the logic block 506, the multiplexer 710 will either output a selected one of the Clock_1 and Clock_2 signals (assuming at least one has toggled relative to the oscillator 508 output signal) or the output signal of the oscillator 508 (assuming it has toggled.)

An important distinction exists between the multiplexers $702_1$ and $702_2$ and the multiplexers 704 and 710. The multiplexers 704 and 710 serve as clock multiplexers as described earlier. Advantageously, described, the safe clock multiplexer system 510 of FIG. 5 precludes the possibility of a missing clock pulse. By controlling the passage of the Clock_1 and Clock_2 signals relative to the oscillator 508 output signal and by controlling the passage of the oscillator 508 output only if it has toggled, the safe clock multiplexer system 510 avoids a situation in which any or all of the clocks become stuck in a no-clock state.

The foregoing describes a clock selector circuit $500_i$, including a safe multiplexer system 510, for distributing clock pulses so as to provide for redundancy while assuring clock synchronism.

The invention claimed is:

1. A router comprising:
    at least a first router portion for routing asynchronous signals, said first router portion having first and second clock signal inputs for receiving first and second clock signals which each toggle at a clock rate, respectively;
    a clock selector circuit within the at least first router portion for selecting from among said first and second clock signal, and an oscillator signal, as a common output clock signal for the at least first router portion, based in part on whether at least one of the first and second clock signals has toggled; and
    a safe clock multiplexer system for detecting whether each of the first and second clock signals has toggled relative to the oscillator signal, and if not, replacing said each non-toggling signal with a signal at a fixed logic state to maintain synchronism of the output clock signal relative to the first and second clock signals.

2. The router according claim 1 wherein the safe clock multiplexer system includes a pair of toggle detectors, each determining whether a separate one of the first and second external clock signals has toggled relative to the oscillator signal.

3. The router according to claim 1 wherein the clock selector circuit selects from among said first and second clock signal, and the oscillator signal, as a common output clock signal for the at least first router portion, based further in part on whether the clock selector circuit serves as a master or as a slave to another clock selector circuit.

4. The router according to claim 1 wherein the clock selector circuit selects from among said first and second clock signal, and the oscillator output signal, as the common output clock signal for the at least first router portion, based further in part on: (i) whether the clock selector circuit serves as its own master, or as a slave to another clock selector circuit, and (ii) whether the common output clock signal will serve as a primary clock signal.

5. The router according to claim 1 wherein the clock selector circuit comprises:
    a first toggle detector for generating an output signal determinative of whether the first clock signal has toggled;
    a second toggle detector for generating an output signal determinative of whether the second clock signal has toggled;
    a logic block for providing an output control signal which varies based in part on the output signal of the first and second toggle detectors; and
    a multiplexer system for selecting among said first and second clock signal, and said oscillator signal, as the common output clock signal for the at least first router in accordance with the logic block output signal.

6. The router according to claim 5 wherein the logic block provides its output control signal based in part on whether at least one of the first and second clock signals has toggled, and whether the clock selector circuit serves as its own master, or as a slave to another clock selector circuit.

7. The router according to claim 5 wherein the logic block provides its output control signal based further in part on: (i) whether the clock selector circuit serves as its own master, or as a slave to another clock selector circuit, and (ii) whether the common output clock signal will serve as a primary clock signal.

8. The router according to claim 1 further comprising:
    at least a second router portion for routing asynchronous signals, said second router portion having first and second clock signal inputs for receiving the first and second clock signals, respectively, which each toggle at a clock rate; and
    a second clock selector within the at least second router portion for selecting from among said first and second clock signals, and the oscillator signal, as a common output clock signal for the at least second router portion, part on whether at least one of the first and second clock signals has toggled relative to the oscillator signal.

9. A method for selecting a clock signal, comprising the steps of detecting a failure of a first clock signal to change state;

detecting a failure of a second clock signal to change state;

detecting whether each of the first and second clock signals has toggled relative to an oscillator signal; and selecting from among the first and second clock signals and the oscillator signal, as a common output clock signal for at least a first router portion, based on whether at least one of the first and second clock signals has toggled with respect to the oscillator signal and on (i) whether the selected clock serves as a master or as slave to another clock and (ii) whether the common output clock signal will serve as a primary clock signal to maintain synchronism of the output clock signal relative to the first and second clock signals.

10. The method according to claim 9 wherein the selecting step further comprises:

selecting from among said first and second clock signal, and said an oscillator signal, as a common output clock signal for the at least first router, based further in part on: whether the common output clock signal will serve as a primary clock signal.

\* \* \* \* \*